Aug. 4, 1942.  A. O. MICKELSON ET AL  2,291,823
PIPE COATING MACHINE
Filed July 1, 1939   9 Sheets-Sheet 1
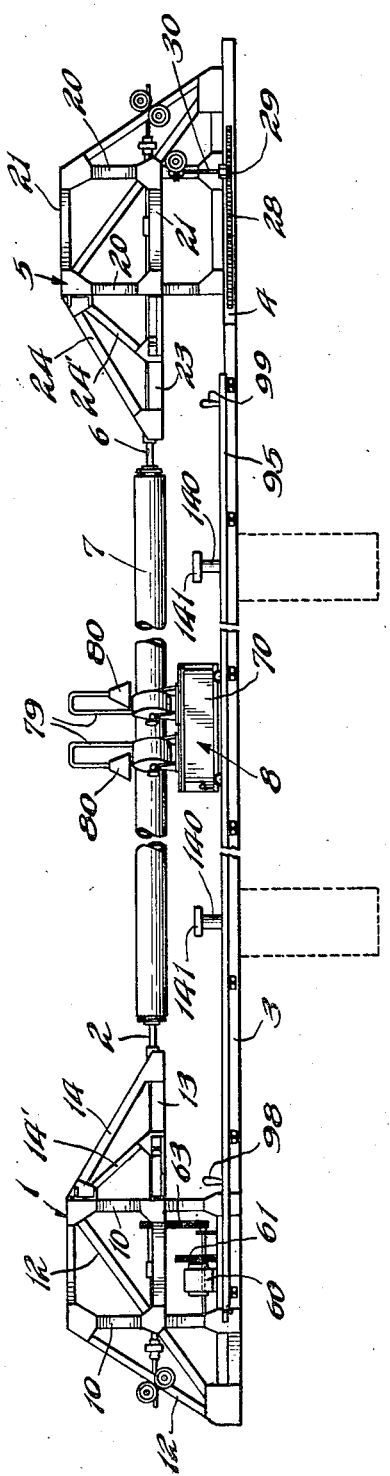
INVENTOR.
Alfred O. Mickelson
Alexander J. Duaei
BY George H. Simmons
ATTORNEYS Aug. 4, 1942.  A. O. MICKELSON ET AL  2,291,823
PIPE COATING MACHINE
Filed July 1, 1939   9 Sheets-Sheet 2
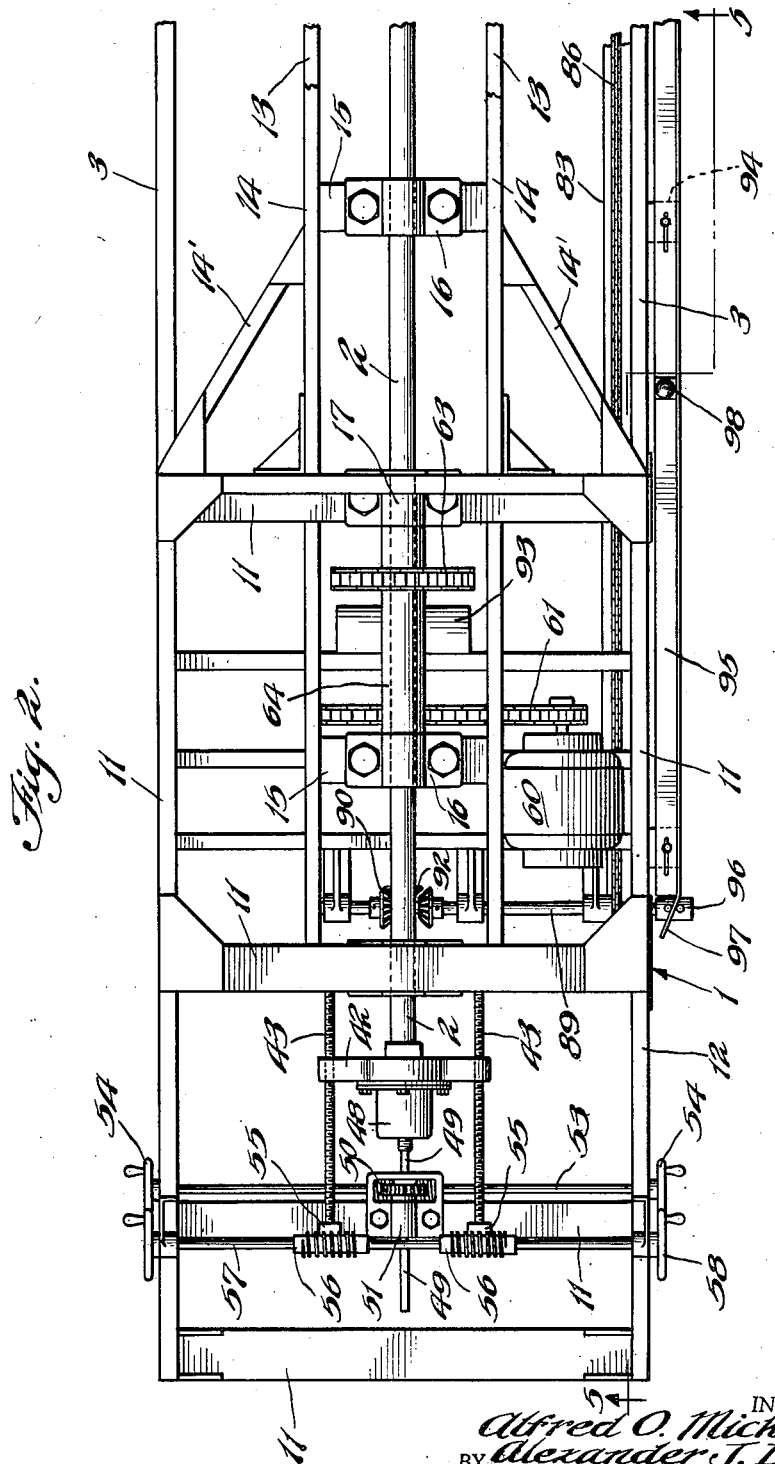
INVENTORS.
Alfred O. Mickelson
Alexander J. Duaei
BY George H. Simmons
ATTORNEY.

Aug. 4, 1942.   A. O. MICKELSON ET AL   2,291,823
PIPE COATING MACHINE
Filed July 1, 1939   9 Sheets-Sheet 3
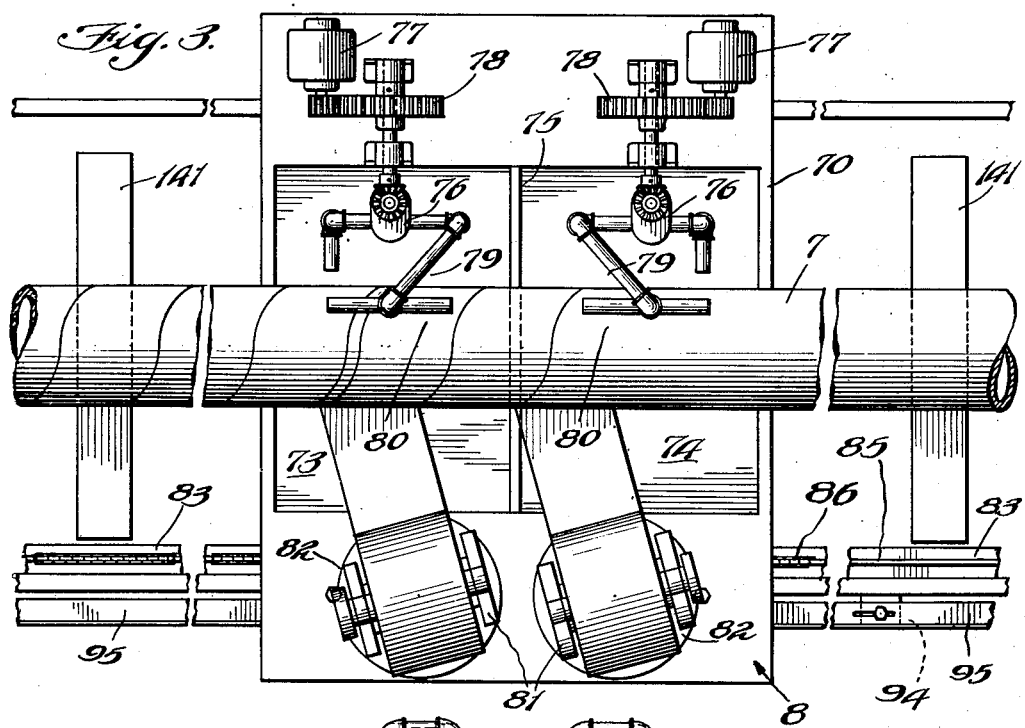
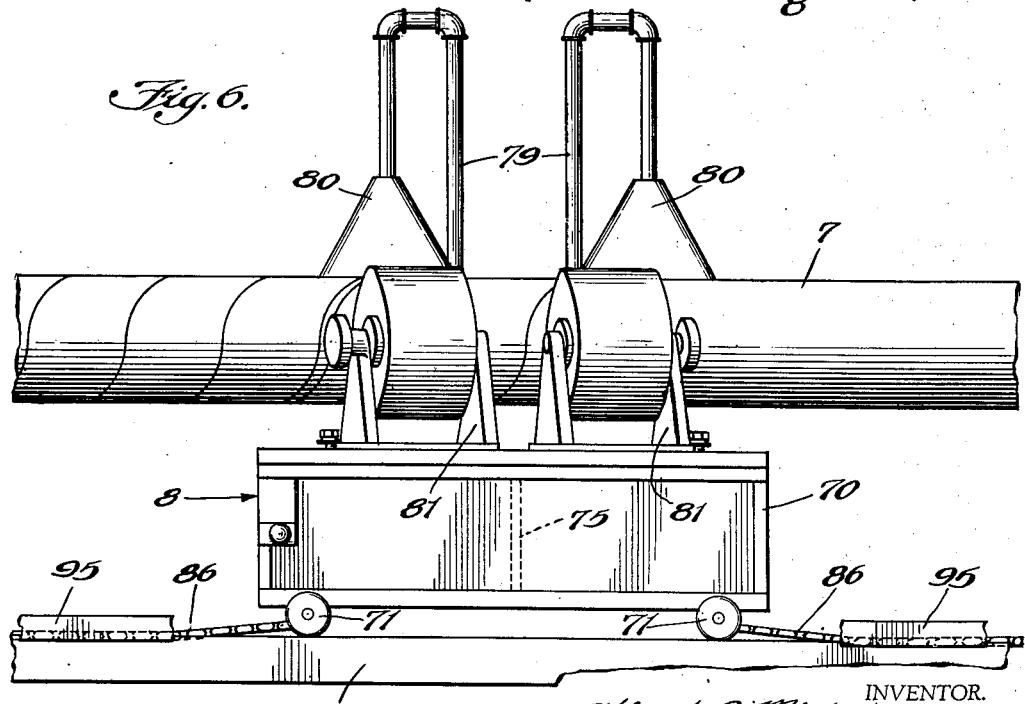

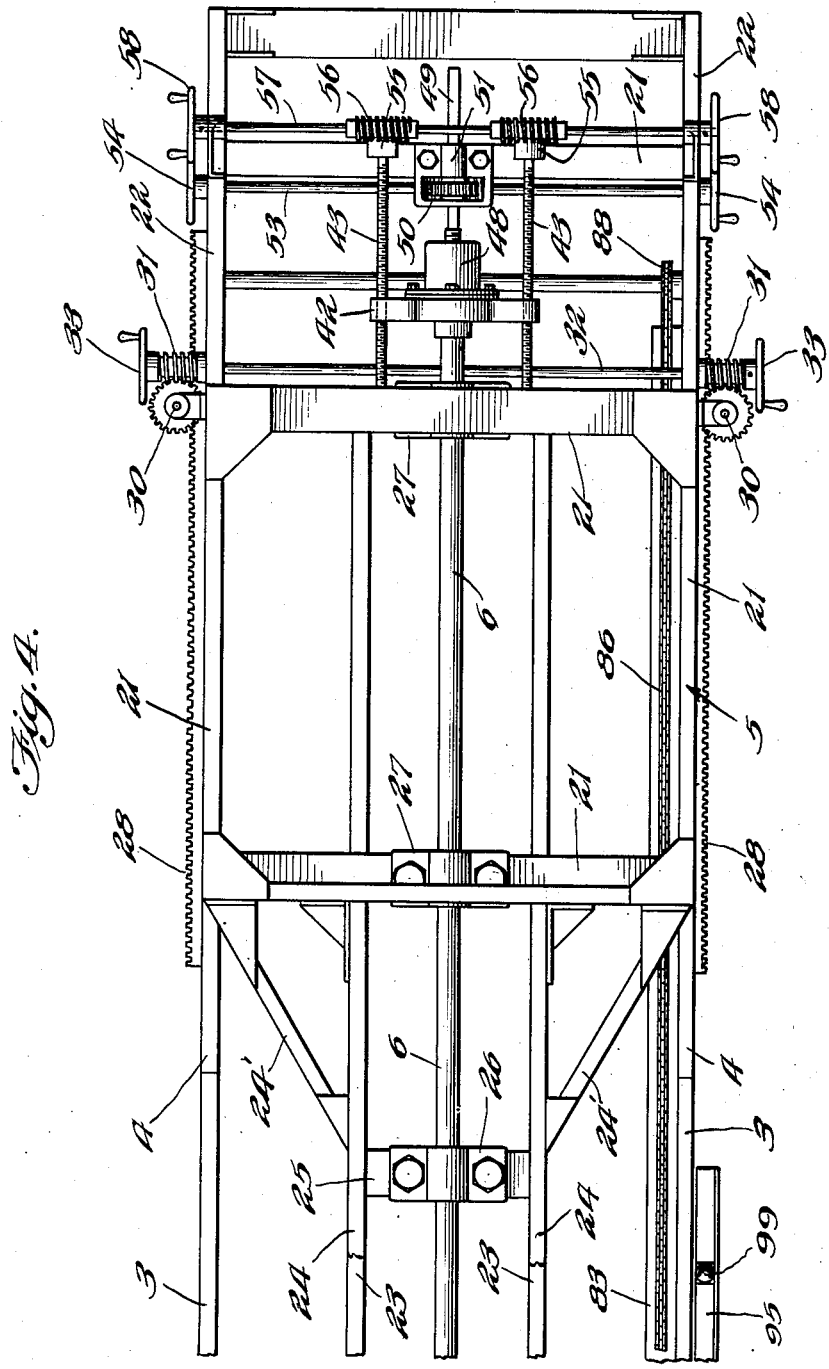

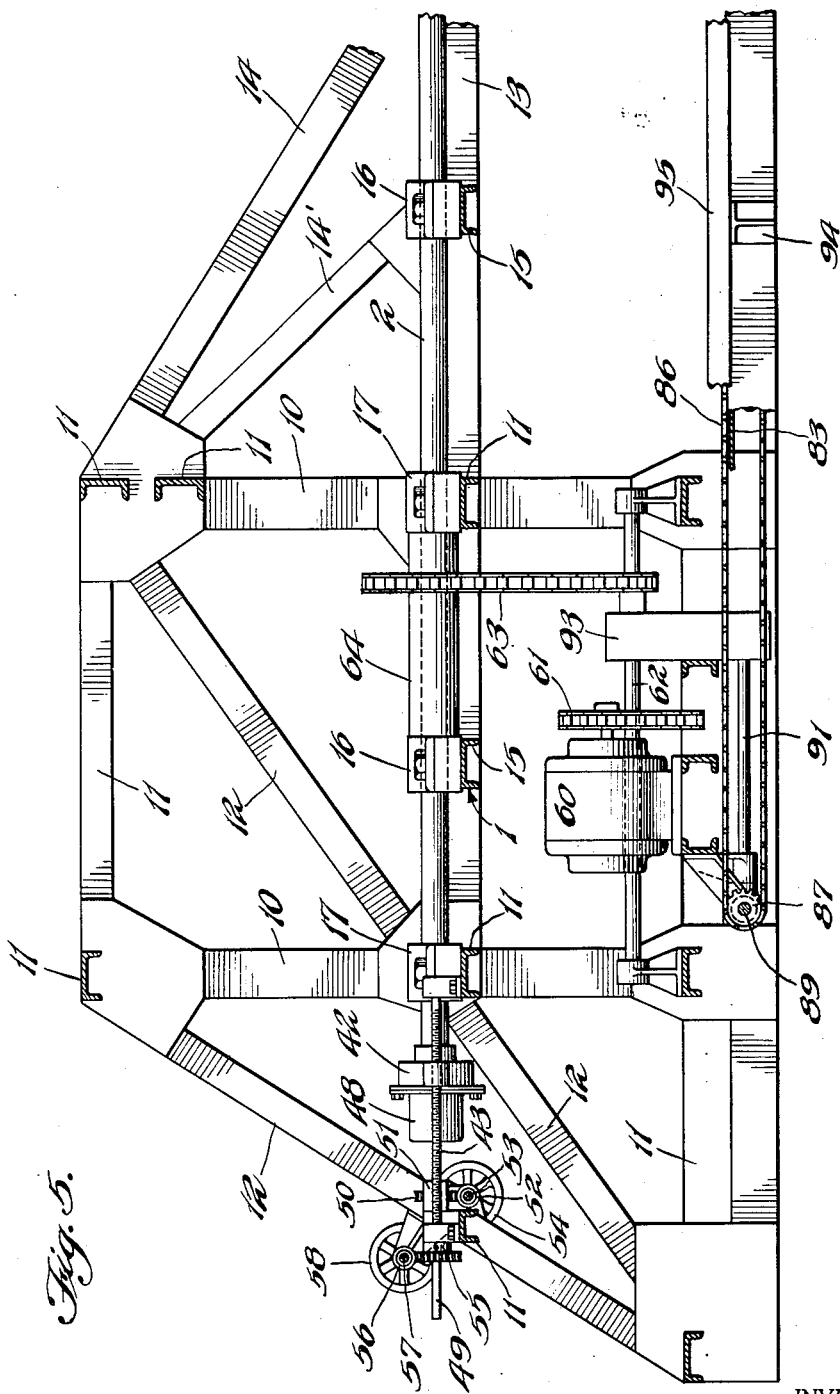

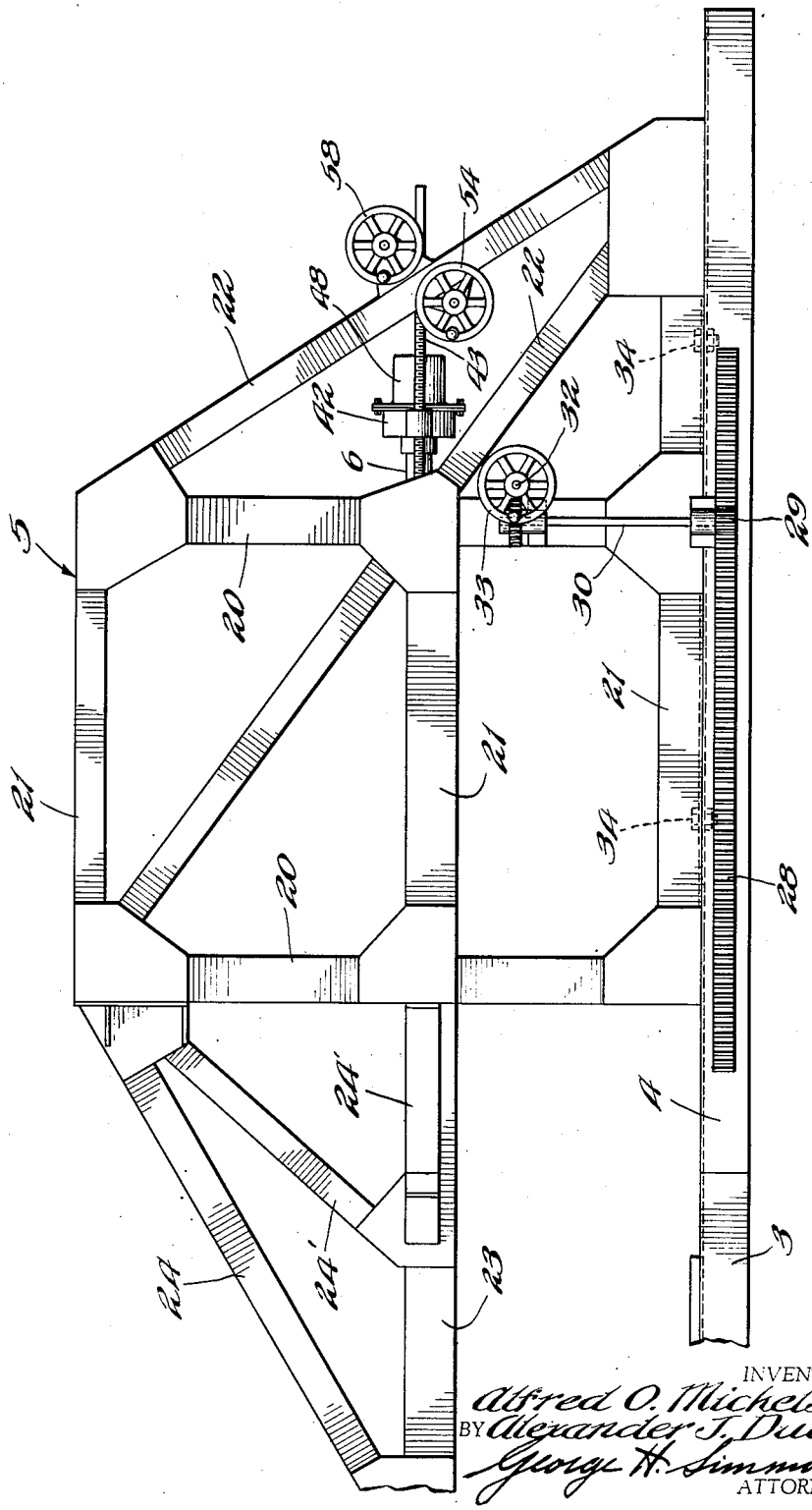

INVENTORS.
Alfred O. Mickelson
Alexander J. Ducci
BY George H. Simmons
ATTORNEY

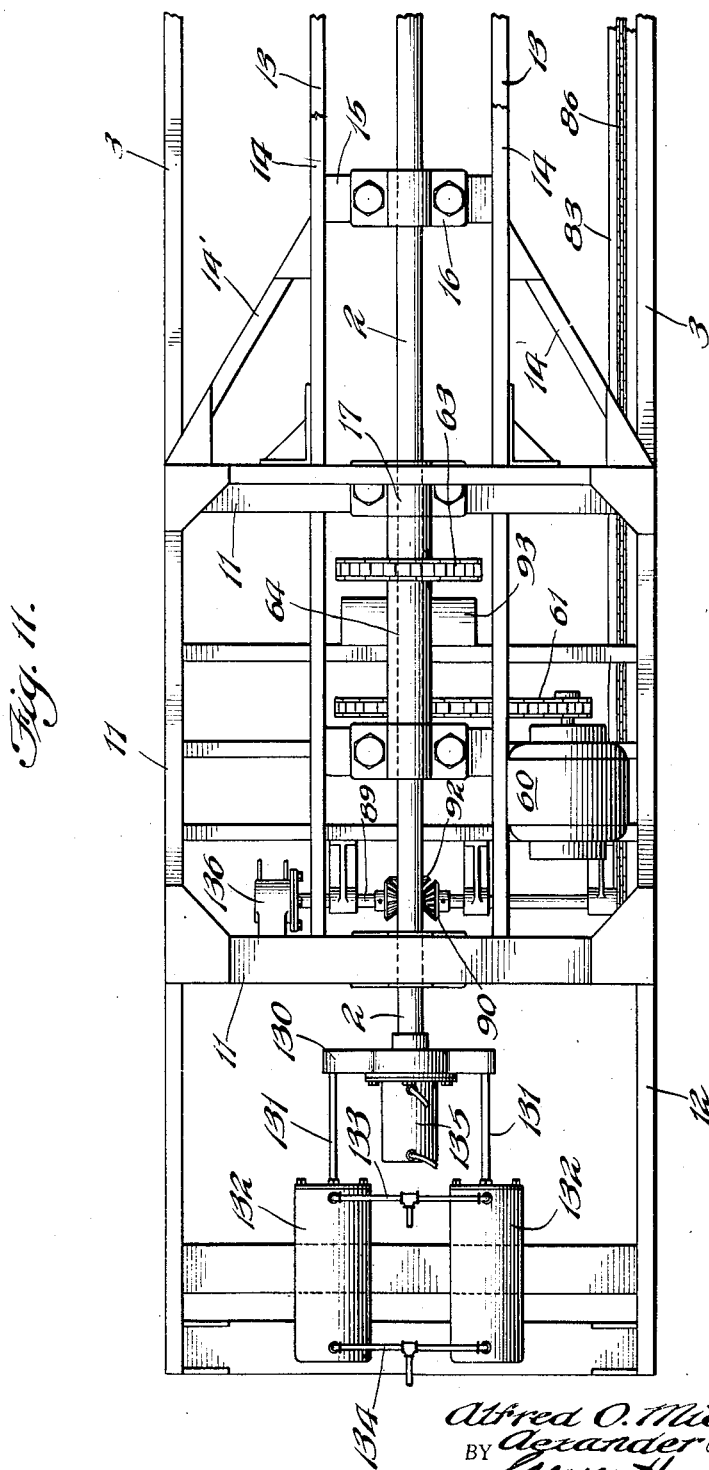

Aug. 4, 1942.　　A. O. MICKELSON ET AL　　2,291,823
PIPE COATING MACHINE
Filed July 1, 1939　　9 Sheets-Sheet 9
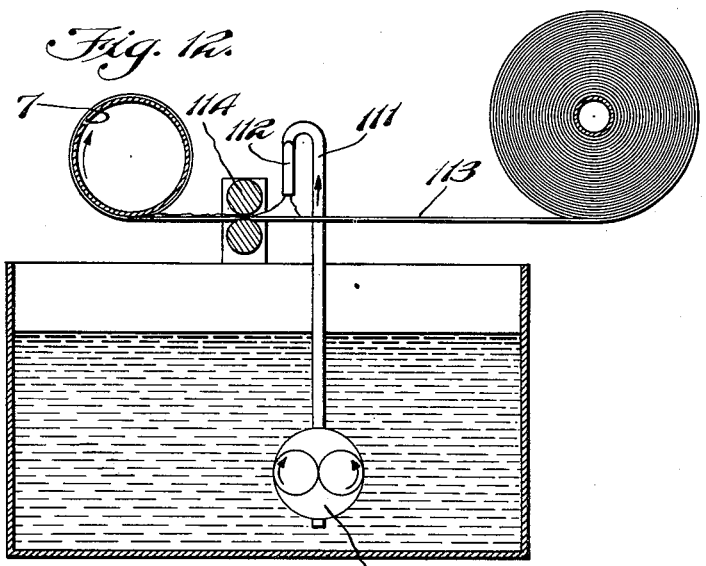
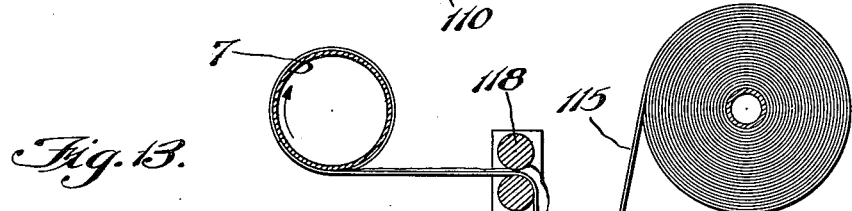
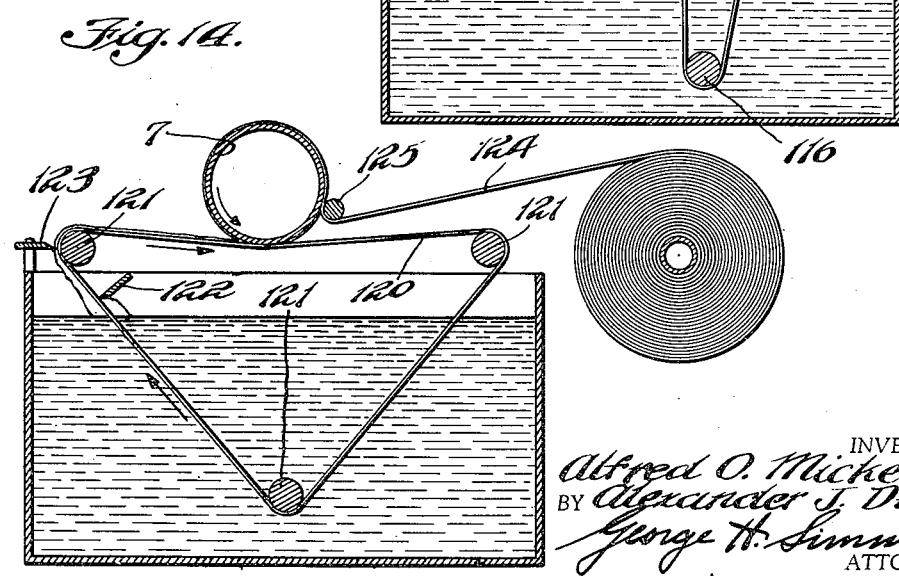
INVENTORS.
Alfred O. Mickelson
BY Alexander J. Duaei
George H. Simmons
ATTORNEYS Patented Aug. 4, 1942

2,291,823

UNITED STATES PATENT OFFICE 2,291,823

PIPE COATING MACHINE

Alfred O. Mickelson, Elmhurst, and Alexander J. Duael, Lombard, Ill.

Application July 1, 1939, Serial No. 282,362

4 Claims. (Cl. 242—11)

This invention relates to machines for coating and wrapping cylindrical objects such as pipes and has for its principal object the provision of a new and improved machine of this type.

It is a main object of the invention to provide a machine capable of coating and wrapping pipes or cylinders of large diameter.

Another object of the invention lies in the provision of a machine that is arranged to rotate the work around its axis while holding the same against movement longitudinally.

A further object of the invention lies in the provision of a travelling coating and wrapping mechanism arranged to move from end to end of the machine and rotating work therein at a speed which is fixed with respect to the speed of rotation of the work.

Still another object of the invention lies in the provision of a machine capable of applying a plurality of layers of coating and wrapping material upon the work and of beginning such application at either end of the work.

Still another object of the invention is the provision of a new and improved coating mechanism capable of applying to the work a film of coating material of uniform thickness.

Further objects of the invention, not specifically mentioned here, will be apparent from the detailed description and claims which follow, reference being had to the accompanying drawings in which a preferred embodiment of the invention is shown by way of example and in which:

Figure 1 is a side elevational view of a machine embodying the teachings of the invention with work in operative position therein;

Figure 2 is a fragmentary plan view of the head or driving end of the machine drawn to an enlarged scale;

Figure 3 is a fragmentary plan view of the central section of the machine showing particularly the coating and wrapping mechanism drawn to an enlarged scale;

Figure 4 is a fragmentary plan view of the tail-stock mechanism of the machine drawn to an enlarged scale;

Figure 5 is a fragmentary elevational cross-sectional view of the head-stock portion of the machine taken substantially along the line 5—5 of Figure 2 looking in the direction of the arrows;

Figure 6 is an elevational view of the central portion of the machine;

Figure 7 is a fragmentary elevational view of the tail-stock;

Figure 10 is a detailed view, partly in section, showing particularly the work supporting shaft and clutch mechanism;

Figure 11 is a fragmentary plan view of the head-stock showing a modified control for the work supporting shaft and clutch mechanism;

Figure 12 is a diagrammatic view of a modified form of coating and wrapping mechanism;

Figure 13 is a view similar to Figure 12 showing still another form of coating and wrapping mechanism; and Figure 14 is a view similar to Figure 12 showing still another form of coating and wrapping mechanism.

Figure 8:
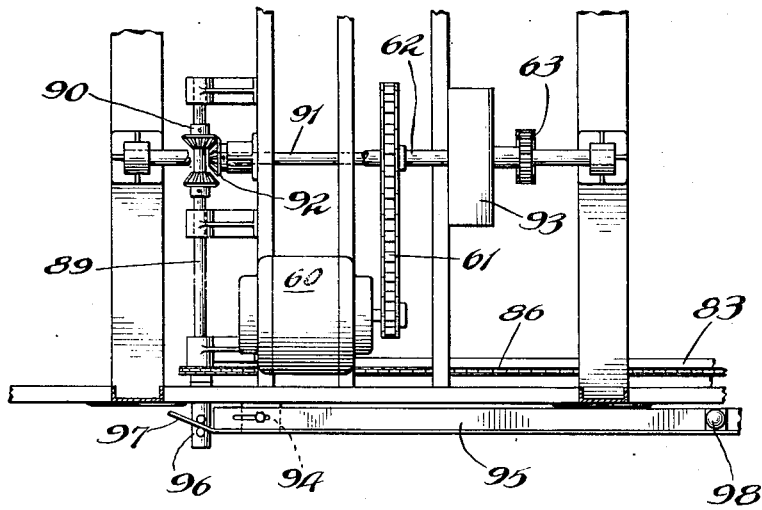
Figure 8 is a fragmentary view of the head-stock showing particularly the driving gear arrangement thereof.

Pipes and other cylindrical objects that are to be buried in the ground are frequently protected from oxidation and electrolysis by a coating of protective material and one or more layers of a fibrous material such as paper or felt. This protective coating, in certain instances, is applied to the pipe lengths before the same are coupled together to form a pipe line, although in other instances, the protective coating is applied after the pipe line has been fabricated. The present invention relates particularly to a machine for applying such protective coatings to pipe lengths.

In our prior patent, No. 2,048,557, there is shown a coating and wrapping machine in which a pipe is fed into a propelling mechanism that rotates the pipe around its axis and simultaneously advances it longitudinally. After leaving the propelling mechanism, the pipe is fed into a suitable coating device which may consist of a coating shoe of the type shown in our Patent No. 2,147,308. After the pipe emerges from the coating shoe, one or more layers of fibrous material, such as paper, are wrapped around it over the protective coating. An arrangement of this kind is very satisfactory for use in the smaller sizes of pipes, that is, in pipes varying from ¾ of an inch up to 12 inches in diameter. However, an arrangement of this type adapted to handle pipes of diameters larger than 12 inches may be unduly expensive to build and maintain and the amount of power necessary to rotate and simultaneously advance a large diameter pipe may be so great as to make the coating and wrapping operation unduly expensive. The present invention provides a machine particularly adapted for handling pipes that are from 14 to 36 inches in diameter in lengths varying from 40 to 60 feet.

In the main, a machine embodying the teachings of the present invention comprises a pair of axially aligned shafts, one supported in a head-stock and the other in a tail-stock and each shaft containing a clutch or pipe engaging mechanism adapted to be fitted inside of the pipe and to support the pipe upon the shaft. The shafts and pipe are rotated at a uniform speed and a movable coating and wrapping mechanism is moved longitudinally of the machine and pipe at a speed definitely fixed with respect to the speed of rotation of the pipe so as to permit coating and wrapping the pipe with one or more layers of materials. The machine is arranged so that coating may be applied to the pipe as the coating mechanism is moved in either direction, that is, in one instance the coating may be moved from the head-stock to the tail-stock to apply coating material thereto and then after the completed work has been removed from the machine and a new pipe inserted, the coating mechanism may apply the material to the new pipe while moving from the tail-stock to the head-stock. This eliminates the necessity of returning the coating and wrapping mechanism to a fixed position at the end of each operation and thereby decreases the time required for loading and unloading the machine.

In other instances, one layer of coating and wrapping may be applied from a point of beginning at one end of the machine and a second layer may be applied from a point of beginning at the other end of the machine and the two layers may be spiraled around the pipe in opposite directions.

Referring now to the drawings, particularly Figure 1, it will be seen that the machine comprises suitable head-stock structure 1 which supports a driving shaft 2. Extending from the head-stock is a trackway 3 which terminates at a base 4 upon which is mounted a tail-stock structure 5 which supports a second shaft 6 that is substantially identical with the shaft 2. Shafts 2 and 6 are each mounted so as to be movable longitudinally of their axes into and out of engagement with the work 7 that is extended between the shafts. A coating and wrapping mechanism indicated generally at 8 is mounted upon the trackway and adapted to apply coating and wrapping material to the work 7. The tail-stock 5 is adapted to be moved toward and away from the head-stock 1 so as to enable the machine to accommodate pipes of different lengths.

As will be seen in Figures 2 and 5, in the embodiment of the invention shown by way of example, the head-stock consists of a main structure composed of vertical members 10 and horizontal members 11 which are reinforced by braces 12. Centrally mounted in the framework thus formed are two horizontal structural members 13 which extend from the framework a considerable distance as will be best seen in Figure 1, and are braced by suitable reinforcing braces 14 and 14'. Extending between the members 13 are cross-pieces 15 which support bearings 16 in which the head-stock shaft 2 is journalled. The arrangement of the structural members going to make up the head-stock framework may be varied within the teachings of the invention, the particular arrangement shown in the drawings being shown by way of example only. The framework thus formed may be fastened together by welding or by riveting, as desired.

As will be seen in Figure 5 in addition to the bearing 16, shaft 2 is supported by other bearings 17 that are mounted upon certain ones of the horizontal structural members 11 of the head-stock frame.

Figure 9:
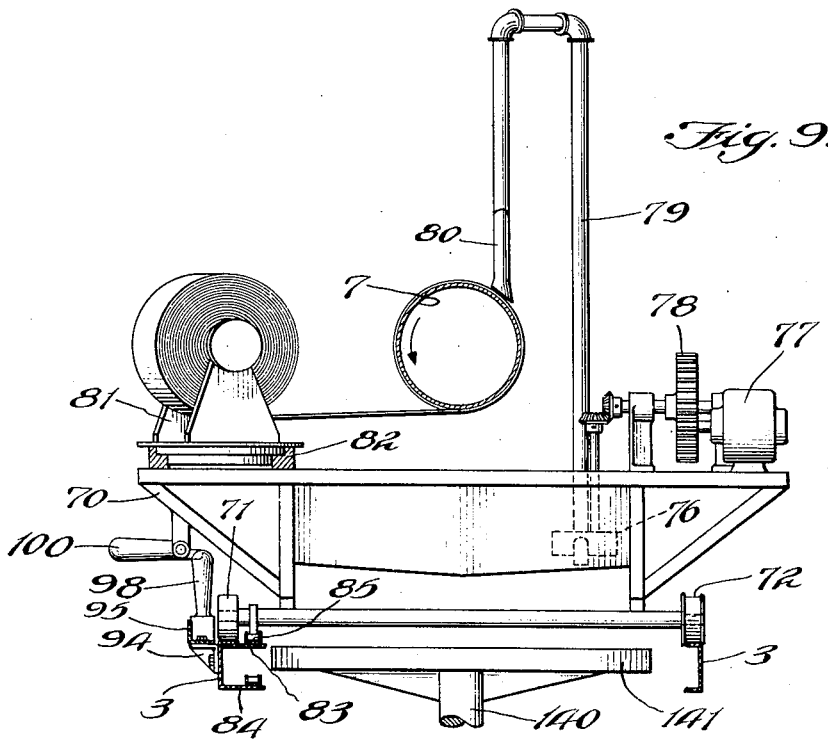
Figure 9 is an end elevational view of the coating and wrapping mechanism viewed from the tail-stock end of the machine.

From Figures 1, 3, 6 and 9, it will be seen that a trackway 3 extends from the main body portion of the head-stock structure 1 beneath the over-hanging portion 13, this trackway extending to a base 4 upon which the tail-stock is mounted. The trackway 3 may conveniently be composed of channel members as shown in Figure 9 which are connected together by suitable braces to produce a sturdy track extending between the head and tail-stocks of the machine.

The tail-stock, Figures 4 and 7, consists of a framework which is very similar to the head-stock framework and comprises vertical structural members 20 that are connected together by suitable horizontal members 21 and are braced by brace members 22. The tail-stock also includes shaft supporting members 23 which are two in number and extend from the one side of the main framework over the trackway 3 and are connected together by suitable cross-members 25 upon which bearings 26 are mounted. The projecting ends of the shaft supporting members 23 are supported by suitable braces 24 and 24' as in the head-stock. The tail-stock shaft 6 is supported in the framework thus formed by bearings 26 and 27, the latter bearings being mounted upon horizontal members 21 of the frame.

The tail-stock 5 is mounted upon a framework or base 4 which may be a continuation of the trackway 3. Mounted upon the side rail members of the base 4 are suitable racks 28 with which are meshed pinions 29 that are mounted upon shafts 30 journalled upon the tail-stock structure. Each of the shafts 30 carries a worm-wheel with which is meshed a worm 31 that is supported upon a cross-shaft 32. By rotating the cross-shaft 32 through a suitable hand wheel 33, the tail-stock can be moved along the base toward or away from the head-stock so as to adjust the machine to receive work of a particular length. After the adjustment has been made, the tail-stock is locked to the base by suitable locking means such as bolts 34. The head-stock framework and the tail-stock framework are arranged so that the shafts 2 and 6 are axially aligned one with the other.

As will be seen best in Figure 10, each of the shafts 2 and 6 terminates in a face plate 35 upon which is mounted a toggle clutch consisting of a base 36 upon which a plurality of toggle links 37 are pivotally mounted. In the drawing the foreground link has been omitted so as to disclose the parts that lie behind it. The shafts 2 and 6 are each hollow and a draw rod 38 extends through the shaft and therebeyond, the end of the draw rod being threaded to receive nuts 39 between which a collar 40 is positioned. Collar 40 carries a plurality of toggle links 41 which connect with the links 37 to operate the same. The clutch thus formed is adapted to fit in the end of a pipe 7 to support the pipe in the machine, as will presently appear.

As will be seen in Figures 2 and 10, the shaft 2 extends from the clutch to a yoke 42 which is supported upon adjusting screws 43 located at the outward end of the head-stock framework. Within the yoke 42 is a bearing 44 which permits the shaft 2 to rotate with respect to the yoke. The shaft carries a collar 45 which registers between thrust bearing members 46 in the yoke to hold the shaft 2 against longitudinal movement with respect to the yoke. As shown, this thrust bearing is a two race ball-bearing, this particular arrangement being an example only, as the use of other suitable forms of thrust bearings is contemplated.

Rod 38 extends through the yoke and thrust bearing and terminates in a similar thrust bearing arrangement 47 that is nested within a bracket 48 carried upon the yoke.

An adjusting shaft 49 is threaded through the end portion of the bracket 48 and fixed to the outer member of the thrust bearing 47, the shaft extending beyond the bracket and through a worm-wheel 50 that is mounted upon a suitable support 51 on one of the horizontal members 11 of the head-stock framework. A worm 52 that is mounted upon a cross-shaft 53 is meshed with the worm-wheel 50. The worm-wheel 50 is free to slide longitudinally of the adjusting shaft 49 but is held against rotation with respect thereto. By this arrangement, when it is desired to operate the clutch links 37 from the position in which they are shown in Figure 10 into engagement with a pipe 7, shaft 53 is rotated by turning suitable hand wheels 54 to rotate the worm 50 and shaft 49. Rotation of the shaft 49 which is threaded through the bracket 48 moves the shaft to the left, Figure 10, and moves with it the draw shaft 38 and collar 40 carried thereby. Toggle lengths 41 are thereby operated to move the clutch links 37 outwardly into engagement with the pipe 7. The foregoing arrangement of the clutch operating mechanism of shaft 2 is duplicated in the tail-stock shaft 6.

In order to permit the shafts 2 and 6 to be moved longitudinally so as to bring the clutches carried thereby into and out of engagement with the pipe 7, yoke 42, Figures 2 and 5, contains threads through which adjusting screws 43 are threaded. The adjusting screws are mounted upon suitable brackets in the framework and each carries a worm-wheel 55 with which is meshed a worm 56 that is mounted upon a cross-shaft 57. By rotating the shaft 57 through the suitable hand-wheels 58, the yoke 42 may be moved to the right or left, Figure 2, thereby to move the shaft 2 in a corresponding direction. The tail-stock is provided with a similar arrangement for moving the shaft 6.

In one embodiment of the machine, shafts 2 and 6 are each adapted to be moved approximately six feet along their respective axes. In the operation of the machine, the tail-stock is set so that the distance between the ends of the over-hanging portions of the head-stock and tail-stock is several feet greater than the length of the pipe to be coated in the machine. The shafts are moved to bring their clutches against the end of the over-hanging projections of the head and tail-stocks and a pipe is then inserted in the machine and aligned with the shafts. The shafts are then moved to bring their clutches into engagement with the pipe after which the clutches are operated to establish a driving connection with the pipe which is then supported in the machine in readiness to be rotated. It will be noted that the clutch mechanisms fit completely within the ends of the pipe and that there are no parts projecting beyond the outside surface of the pipe to interfere with coating and wrapping operations.

In order to drive the work, the head-stock is provided with a source of power shown as an electric motor 60, Figures 2, 5 and 8, that is connected by a suitable driving chain 61 to a lay shaft 62 which in turn is connected by a driving chain 63 to a sleeve 64 that is keyed upon the shaft 2. By suitable choice, the size of sprocket wheels mounted upon the motor, the shaft 62 and the sleeve 64, the speed of rotation may be reduced so that the shaft 2 will be rotated at a relatively slow speed, say approximately 20 revolutions per minute. Although driving chains 61 and 63 are shown, gear trains may be substituted, if desired, within the teachings of the invention. Electric motor 60 is preferably a reversible variable speed motor so that the shaft 2 may be rotated in either direction and at any speed desired. The rotation of the shaft 2 will rotate the pipe 7 and the shaft 6 in the obvious manner.

In order to apply coating and wrapping materials to the pipe, the machine may be equipped with any one of a number of different types of coating and wrapping mechanisms, the particular type chosen depending upon the nature of the material to be applied to the pipe and the specifications regarding the lap, travel, etc. of the wrapping material.

As will be seen in Figures 1, 3, 6 and 9, the coating and wrapping mechanism in its preferred form consists of a car-like body 70 that is mounted upon the trackway 3 by suitable wheels 71 and 72, the wheels 72 being flanged at both ends to retain the car upon the track. The car preferably contains two tanks 73 and 74 which are separated from each other by dividing wall 75 so that different coating materials may be carried in the two tanks, if desired. It frequently happens that the coating materials used in this work must be applied hot and the tanks 73 and 74 may, therefore, be provided with suitable heating means arranged to maintain the material in the tank at the desired temperature. There are a number of suitable tank heating arrangements which are well understood by those skilled in the art and the heating arrangement has, therefore, been omitted from the drawings to avoid unnecessary complications thereof.

Located in each tank is a pump 76 which may conveniently be a gear pump that is driven by a source of power 77 through a suitable reduction gear 78. The pump elevates the coating material from the tank through a pipe 79 to a fish-tail spreader 80 located in juxtaposition to the pipe and arranged to spread a film of coating material on the pipe. The point of application of the material to the pipe is to one side of the vertical center of the pipe so that the material travels up-hill from the spreader to the center of the pipe. The edge of the spreader adjacent to the center line of the pipe is mounted at a fixed distance from the outer surface thereof so as to regulate the thickness of the coating material applied. The gear trains through which the pumps are driven will be encased in suitable protective housings, which have been omitted from the drawings so as to show more clearly the driving arrangement.

The coating mechanism thus described is moved along the trackway 3 in the manner to be hereinafter described so that the film of material applied to the pipe will extend around the pipe in a spiral path. Mounted upon the coating mechanism 70 are a plurality of paper reels 81 each of which has a turn-table base 82 that permits the axis of the roll of paper carried thereon to be set at any desired angle with respect to the axis of the pipe. Suitable locking means, such as bolts, are provided so that when once set the reel will remain fixed with respect to the axis of the pipe. The paper is extended from the reel to the pipe and wrapped in a spiral path therearound as the pipe is rotated and the coating mechanism 70 moved along the trackway.

As will be seen in Figures 3, 4, 5, 6, 8 and 9, one of the rails 3 of the trackway carries brackets 83 and 84 which support a supporting rail 85 upon which a chain 86 rests. The head-stock carries a sprocket wheel 87 and the tail-stock carries a sprocket wheel 88 around which the chain is threaded, the chain being connected to the car 70 as shown in Figure 6. The head-stock sprocket wheel 87 is mounted upon a shaft 89 that extends transversely of the machine and upon it a so-called cluster gear 90 is fixed. The head-stock also carries a driving shaft 91 that has a bevelled gear 92 that is adapted to be meshed with one or the other of the gears of a cluster gear 90. Shaft 91 is connected to the lay shaft 62 by a suitable change of speed mechanism 93, Figures 5 and 8, so that as the lay shaft 62 is rotated shaft 91 will be rotated at a predetermined relative speed. Rotation of the sprocket wheel 87 moves the chain 86 longitudinally of the machine in a direction depending upon which one of the two cluster gears 90 is meshed with the bevel gear 92, and since the car 70 is fastened to the chain, it will be moved along the trackway at the same speed as the chain.

Mounted upon the same rail of the trackway 3 as the driving chain 86 are a plurality of brackets 94 which support a control rod 95. The control rod, which may conveniently be an angle member, extends from end to end of the machine. Mounted upon the cross-shaft 89 is a collar 96, Figure 8, which carries pins that engage opposite sides of an angular extension 97 of the rod 95, so that as the rod 95 is moved in one direction shaft 89 will be moved longitudinally of its axis to mesh one of the cluster gears 90, and as the rod 95 is moved in the opposite direction the shaft 89 will be moved correspondingly to mesh the other one of the cluster gears with the driving gear 92.

It is contemplated that the driving gears, chains, etc. of the machine will be encased in suitable protective housings to guard workmen from injury and to protect the parts from dirt and dust and to permit proper lubrication. However, these housings have been omitted from the drawings so as to show more clearly the parts contained in them.

Located upon the rod 95 near the head-stock of the machine is a control handle 98 and located on the rod upon the tail-stock is a similar control handle 99. The framework of the car 70 carries a latch 100 which is adapted to engage the control handles 98 and 99 so that as the car is moved the control rod 95 will be moved to shift the gears controlling the direction of travel of the car. By suitable locating of the control handles 98 and 99, stopping and reversing points can be determined at any desired point.

As will be seen in Figure 1, the projecting portion 13 of the head-stock extends from the main portion of the head-stock structures sufficiently to permit the car 70 to travel under it, the handle 98 being located so as to stop the car when it is disposed entirely beneath the over-hanging portion of the head-stock. Pipe 79 by which the coating material is elevated to the spreaders 80 extends upwardly sufficiently to ride over the brace member 14, so that the coating and wrapping mechanism can be retracted into the protection of the head-stock framework during loading and unloading of the machine.

Similarly, the over-hanging portion 23 of the tail-stock is arranged to permit the coating mechanism to pass under it and the control handle 99 is located so as to stop the car when it is completely under the over-hanging portion of the tail-stock. This permits moving the coating mechanism completely out of the way of pipes being moved into or out of the machine regardless of whether the mechanism is at the head-stock or tail-stock end of the machine.

The characteristics of the coating materials that a machine of this type may be called upon to apply vary greatly. Some materials must be maintained at a very high temperature in order to maintain them in fluid state and such materials set very rapidly when applied to pipe, particularly if the temperature of the pipe is relatively low. The arrangement shown in Figure 9 necessitates a considerable travel between the point of application of the coating material to the pipe and the point of application of the wrapper thereover and in certain instances when it is desired to bond the wrapper to the pipe, the coating material may set before the point of application of the wrapper has been reached.

In Figure 12 we have diagrammatically shown a modified form of coating and wrapping which can be used in the machine. In this arrangement, the pump 110 elevates the coating material through a pipe 111 to a spreader 112 which deposits the coating material upon the web of wrapping material 113, the point of application being just ahead of a doctor blade arrangement 114 that is located close to the point of application of the coating material upon the pipe 7. The doctor blade may be adjusted to regulate the thickness of the film of coating material on the wrapper 113 so that the thickness of coating material on the work may be accurately determined. Since the coating material travels but a very short distance from its point of application on the wrapper, its temperature at the time of application to the pipe will be high enough to insure that a proper bond between the coating material and pipe will be formed.

In Figure 13 we have shown a similar arrangement in which coating material is applied to both sides of the web of wrapping material 115. In this embodiment of the invention, the wrapping material is threaded down around a suitable roller 116 that is submerged in the coating material and then up past a doctor blade 117 which removes substantially all of the coating material from one side of the web. The web then passes through doctor rolls 118 which are adjusted to leave upon the opposite face of the web the desired thickness of coating material. The doctor blade is located close to the point of application of the web to the pipe so as to insure that the coating material will be at a temperature high enough to insure proper bond when applied to the pipes.

In certain other instances, an arrangement such as is shown in Figure 14, may be advantageously used. In this arrangement, an endless web of flexible material 120 is threaded around suitable rollers 121 one of which is submerged in the coating material carried in the machine. The web 120 is driven continuously by a suitable motor and preferably is composed of thin metal of relatively high polish. In the operation of this arrangement, as the web travels in the direction indicated by the arrow, the tacky coating material is picked up thereby, the material on one side of the web being scraped off by a doctor blade 122 located immediately above the upper level of the coating material. A doctor blade 123 is located adjacent to one of the rolls 121 and is adjustable so as to permit leaving a film of pre-determined thickness upon the web. After passing over this roll, the web travels a short distance into engagement with the pipe 7 which is rotating in the same direction as the travel of the web but at a slightly higher peripheral speed. The film of coating material is troweled off of the web 120 by the pipe 7 and applied thereto under pressure as indicated by the deflection in the web in Figure 14. The film of coating material thus applied to the pipe may be made of any desired width by suitable choice of the web 120 and the wrapping material 123 is brought into close proximity to the point of application of the coating material to the pipe by being threaded around a suitable roller 125 so that the web of wrapping material will be applied before the coating material has set. By this arrangement, the thickness of the film of coating material can be very accurately regulated as will be apparent to one skilled in the art.

In certain instances it may be advantageous to equip the coating and wrapping mechanism 70 with a coating shoe of the type shown in the co-pending application of Duaei and Pavlinek, Serial No. 169,554, filed October 18, 1937, Patent Number 2,188,001 which coating shoe consists of a semi-cylindrical half shoe that is spring mounted in engagement with the bottom half of the pipe and disposed directly beneath an applicator such as 80.

In the machine hereinbefore described, the shafts 2 and 6 have been moved longitudinally by mechanical arrangemnt consisting of gears and screws and the clutch mechanisms have been operated by similar arrangements. In certain instances, it may be advantageous to move the shafts longitudinally and to operate the clutches by fluid pressure means which may be either pneumatic or hydraulic. In Figure 11 we have shown such an arrangement by showing headstock in which the shaft 2 is equipped with a yoke 130 that is connected by suitable rods 131 to pistons located in cylinders 132. The cylinders are cross-connected at one end by suitable piping 133 and at the opposite end by similar piping 134. Pressure admitted to the left hand end of the cylinders 132 will move the pistons and rods 131 to the right, Figure 11, thereby to move the shaft 2 to the right, and pressure admitted to pipe 133 to the opposite ends of the cylinders will move the shaft in an opposite direction. The shafts may be located in any desired position by balancing off the pressures in the two ends of the cylinders in the manner well understood by those skilled in the art.

In Figure 11 we have also shown a cylinder 135 carried by the yoke 130 and containing a piston to which the draw rod 38, Figure 10, is attached. It is obvious that pressure admitted to one end of the cylinder will move the draw rod in one direction and admittance of pressure in the other end will operate the rod in an opposite direction thereby to operate the clutch. In Figure 11 we have also shown a cylinder into which cross-shaft 89 is extended and terminated upon a piston. The cylinder 136 is operated to control the movement of the coating and wrapping mechanism along the trackway. The tail-stock of the machine may be similarly equipped with fluid pressure cylinders.

Pipes such as the machine of the present invention is adapted to coat and wrap are quite heavy and usually come in lengths varying from 40 to 60 feet. Pipes may be loaded into the machine by a crane, not shown, which supports the pipe in substantial alignment with the clutches which are then moved toward each other into the ends of the pipe. After the coating and wrapping operations have been completed, the finished pipe may be picked up by the crane and carried to its destination. Since the materials used to coat the wrapped pipes are somewhat fragile, it is preferable that the crane used in handling the finished pipe be equipped with devices which engage the inside of the pipe at the ends thereof in the manner similar to the clutches, so as to minimize the danger of damaging the coating materials. Under such circumstances, it is necessary that the pipe be temporarily supported while the clutches are withdrawn and before the crane picks it up and to this end in Figures 1, 3 and 9 we have shown jacks which consist of fluid pressure rams 140, each of which carries a cross-bar 141 that extends transversely of the machine and is adapted to fit between the side rails of the trackway 3. When retracted into this position, the jack leaves the trackway clear so that the coating and wrapping mechanism may travel therealong. As soon as the pipe is finished, the ram is operated to bring the cross-piece 141 into engagement with the pipe to support it so that the shafts 2 and 6 may be retracted and the crane members attached to the pipe.

In certain instances, the new pipe that is to be coated may be rolled into the machine from a suitable trackway, not shown, with which the cross-members 141 are brought into substantial alignment.

Throughout the foregoing specification, we have referred to the work that is to be coated and wrapped by the machine as a pipe, but it will be understood that the machine may be used to coat any large cylindrical device and that the pipe referred to is but an example of the work. Furthermore, the particular arrangement of frameworks and other instrumentalities shown and described in the embodiment of the invention which serves as an example may be modified within the teachings of the invention without departing from the scope and spirit thereof. In the operation of the machine, the coating and wrapping mechanism is moved to one end or the other of the trackway where it is protected by the over-hanging portion of the framework during the loading and unloading of the machine. The machine is then started and the coating and wrapping mechanism operated to apply one or more layers of coating and wrapping material on the work. In certain instances two coats may be applied simultaneously as the mechanism travels from one end of the trackway to the other. In other instances, it may be necessary to apply one layer of coating and wrapping material as the mechanism travels along the trackway and then to apply a second layer of coating and wrapping material as the mechanism is returned to the starting point. This latter procedure is advantageous when it is desirous that the wrapping materials be spiralled around the work in opposite directions.

The machine of our invention is possessed of many advantages. It may be built ruggedly at low cost and operated at a minimum expense. It can be readily loaded and unloaded being free of all over-hanging obstructions which make difficult the operation of a crane in connection with loading and unloading. Large size pipes of varying length can be accommodated by the machine and the coating and wrapping operations may be varied to meet the particular conditions encountered.

Having thus complied with the statutes and shown and described a preferred embodiment of our invention, what we consider new and desire to have protected by Letters Patent is pointed out in the appended claims.

What is claimed is:

1. In a coating and wrapping machine, a pair of frameworks each having an over-hanging portion, said over-hanging portions extending towards each other, a shaft journalled in each framework and extending beyond said over-hanging portion, means on each framework for moving the corresponding shaft longitudinally, means on one framework for rotating the shaft carried thereby, chuck means on said shafts, means for operating said chuck means, a trackway extending between said frameworks, a car mounted on said trackway for movement therealong, means on said one framework for moving said car along said trackway from a position under the over-hanging portion of a first one of said frameworks into a position under the over-hanging portion of the other one of said frameworks, and means for stopping said car moving means to bring the car to rest under the over-hanging portions of said frameworks.

2. In a coating and wrapping machine, a pair of spaced apart frameworks, an extension on each framework projecting toward the other framework, a shaft in each framework extending beyond the extension thereof, work gripping means on each shaft, a pair of rails extending between said frameworks beneath said shafts, work aligning means disposed between said rails, means for extending said aligning means to align work with said work gripping means and for retracting said aligning means to clear said rails, a car on said rails, means for rotating said shafts, means for moving said car along said rails a fixed distance per revolution of the shafts, and means for stopping the car to bring the same to rest under said framework extensions.

3. In a coating and wrapping machine, a pair of spaced apart frameworks, an extension on each framework projecting toward the other framework, a shaft in each framework extending beyond the extension thereof, work gripping means on each shaft, a pair of rails extending between said frameworks beneath said shafts, work aligning means disposed between said rails, means for extending said aligning means to align a piece of work with said work gripping means and for retracting said aligning means to clear said rails, a car on said rails, means for rotating said shafts, means for moving said car along said rails a fixed distance per revolution of the shafts, and means operated by the car for bringing the same to rest under said framework extensions.

4. In a coating and wrapping machine, a pair of spaced apart frameworks, an extension on each framework projecting toward the other framework, a shaft in each framework extending beyond the extension thereof, work gripping means on each shaft, a pair of rails extending between said frameworks beneath said shafts, a pair of rams disposed between said frameworks and between said rails, platforms on said rams over which work may be rolled into alignment with said work gripping means, said rams being retractable to position said platforms between and beneath said rails to clear the same, a car on said rails, means for rotating said shafts, means for moving said car along said rails a fixed distance per revolution of the shafts, and means operated by the car for bringing the same to rest under said framework extensions.

ALFRED O. MICKELSON.
ALEXANDER J. DUAEI.